July 28, 1936. B. L. MOTT 2,049,074
CABLE SHORTENER
Filed Oct. 31, 1935
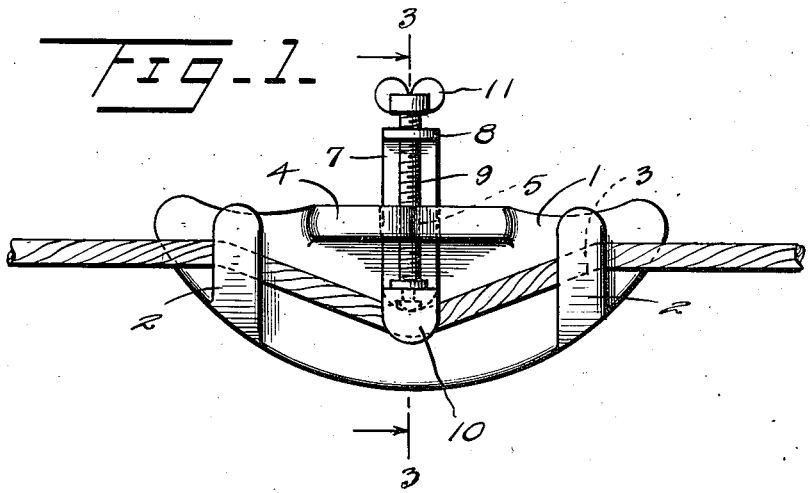
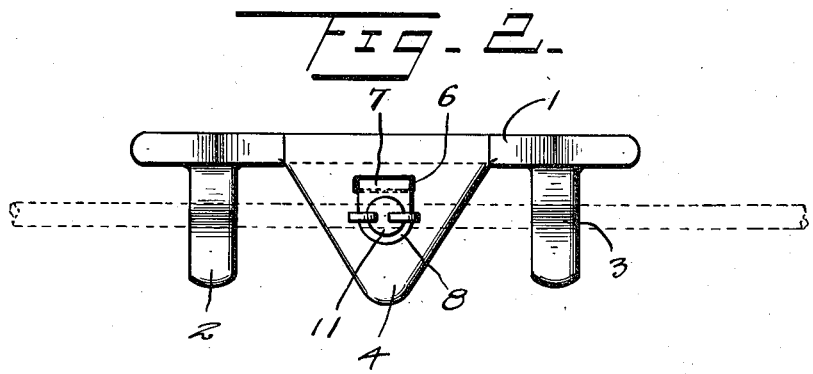
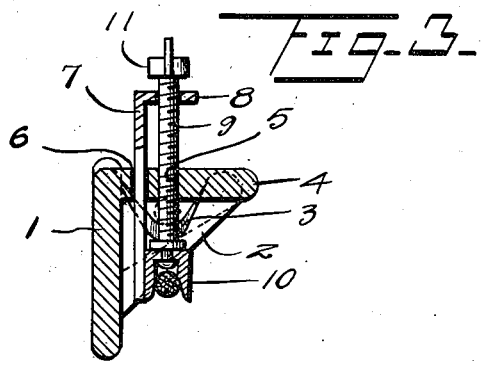
Inventor
B. L. Mott
By Watson E. Coleman
Attorney Patented July 28, 1936

2,049,074

UNITED STATES PATENT OFFICE 2,049,074

CABLE SHORTENER

Bertram L. Mott, Trenton, N. J.

Application October 31, 1935, Serial No. 47,678

3 Claims. (Cl. 24—71.1)

This invention relates to devices for taking up slack in cables or rods, and is designed particularly for use upon light rods of the character of motor vehicle brake rods.

The primary object of the present invention is to provide a cable or rod shortening device which is easily installed and which may be applied to rods of the character of motor vehicle brake rods, without having to disconnect either end of the rod.

Another object of the invention is to provide a cable or rod shortening device which is designed to develop a high degree of power but which may be so controlled that any desired tension may be applied to the rod or cable to which it is attached, whereby when applied to a brake rod the adjustment of the brakes without touching the regular adjusting screw, may be accomplished.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a view in elevation of the device showing the same in use.

Fig. 2 is a view in top plan of the device per se.

Fig. 3 is a section on the line 3—3 of Fig. 1.

Referring now more particularly to the drawing wherein like numerals of reference indicate corresponding parts throughout the several views, the numeral 1 indicates a plate which constitutes the body of the shortener device and which is cast in any suitable metal such as aluminum, bronze, or steel, and may be relatively thick, for strength, as shown.

Adjacent each end this plate has cast integral therewith an arm or bracket 2, the upper surface of which is recessed to form a saddle 3 in which the cable or rod which is to be tightened may lie.

Between the brackets 2 there is formed integral with the plate at one longitudinal edge the horizontal bracket 4 which lies with its lower surface in a plane slightly above the plane of the bottoms of the saddles 3. By this means a relatively stiff cable or light brake rod may be easily slipped into position beneath the horizontal bracket 4 and across the first mentioned brackets 2.

The bracket 4 has a threaded aperture 5 formed therethrough and between this aperture and the body 1 is formed a guide slot 6. Slidably extended through the guide slot 6 is an elongated flat plate 7 which at its upper end has the laterally turned portion 8 which overlies the threaded aperture 5 and which has an aperture therethrough through which a screw 9 is adapted to pass. This screw is threaded through the aperture 5 and upon its lower end carries the yoke 10 which opens downwardly and which is designed to position across a cable or rod supported in the saddles 3. The lower end of the plate 7 is rigidly secured to the inner side of the yoke 10 and it will thus be seen that with each end of this plate connected with the screw 9 additional rigidity is given to the latter so that any lateral strains imposed thereon while it is being tightened will not cause the screw to bend.

At its upper end the screw 9 is provided with a thumb nut or head 11 by which it may be conveniently turned.

From the foregoing it will be readily apparent that with the present device a cable or rod may be shortened or tightened to a desired degree merely by slipping the tightener into position so that the cable extends between the horizontal bracket 4 and across the brackets 2 and passes through the yoke 10. The screw 9 then being turned to force the yoke toward the side of the plate opposite from that upon which the bracket 4 is fixed will cause the rod or cable to be forced laterally between the brackets 2 and thus be tightened up throughout its length.

I claim:

1. A tightener of the character described, comprising an elongated plate, a pair of bracket members formed integral with the plate each adjacent an end of the same and each formed to provide a saddle, a horizontal bracket formed integral with the plate between the first mentioned brackets, a screw member threaded through the horizontal bracket and carrying a cable engaging yoke at one end, and means carried by the screw and having sliding connection with the horizontal bracket for guiding and strengthening the screw.

2. A tightener of the character described, comprising an elongated plate, a bracket member formed integral with the plate adjacent each end and having a recessed top surface forming a saddle, a horizontal bracket disposed between the first brackets and formed integral with the plate, a screw threaded through said horizontal bracket, a cable engaging yoke member carried upon the

end of the screw, a guide element slidably extended through said horizontal bracket and paralleling the screw, and connecting means between each end of the guide element and the screw.

3. A device of the character described, comprising an elongated plate, a bracket formed integral with the plate at each end and having the surface recessed to form a cable saddle, a horizontal bracket integral with the plate and disposed between the first brackets, a screw member threadably extended through the horizontal bracket, a cable engaging yoke swivelly attached to one end of said screw, said horizontal bracket having a slot therethrough adjacent the screw, an elongated guide plate slidably extended through said slot and paralleling the screw, said plate having one end attached to said yoke, and a lateral apertured extension upon the other end of the plate through which the screw passes.

BERTRAM L. MOTT.